United States Patent Office 3,020,889
Patented Feb. 13, 1962

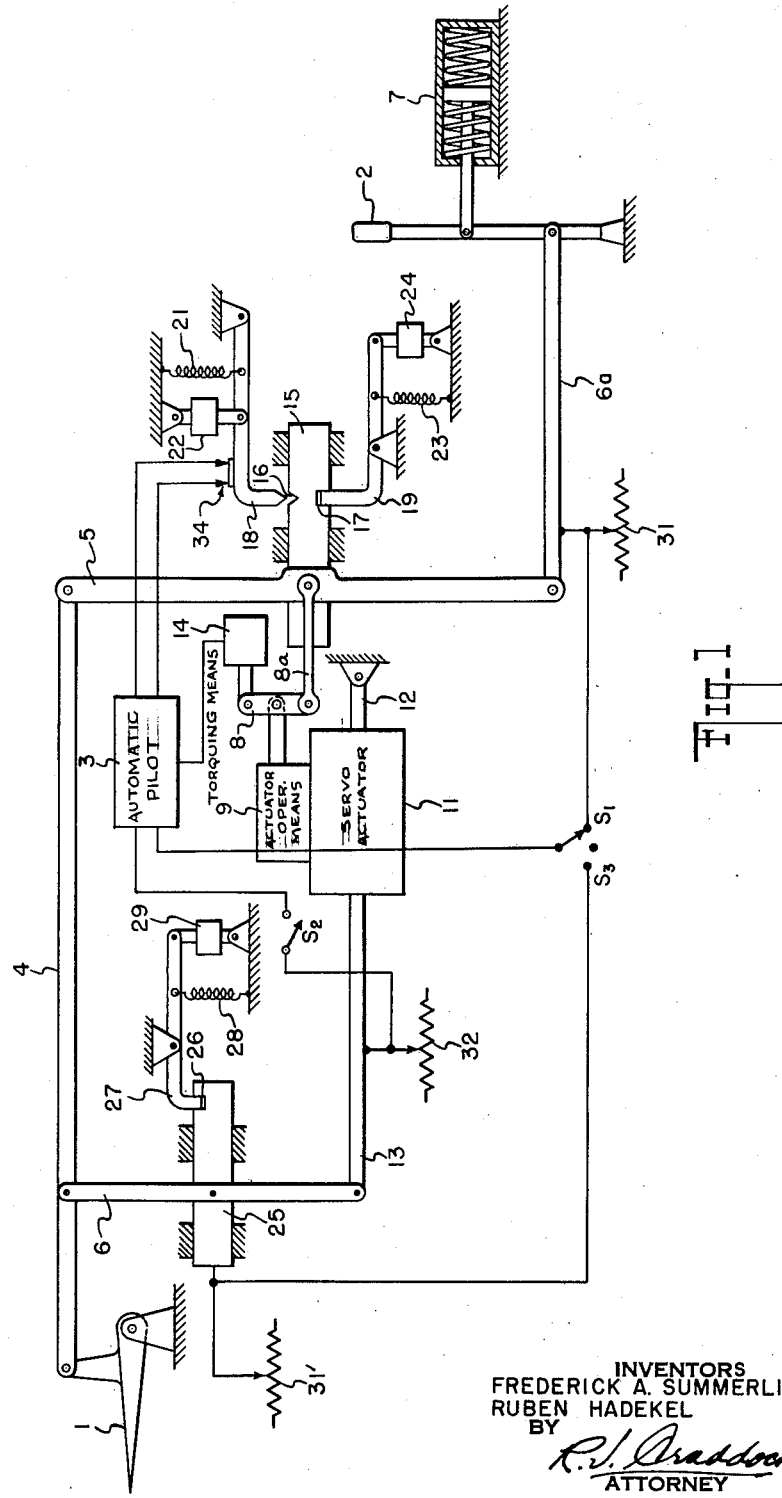

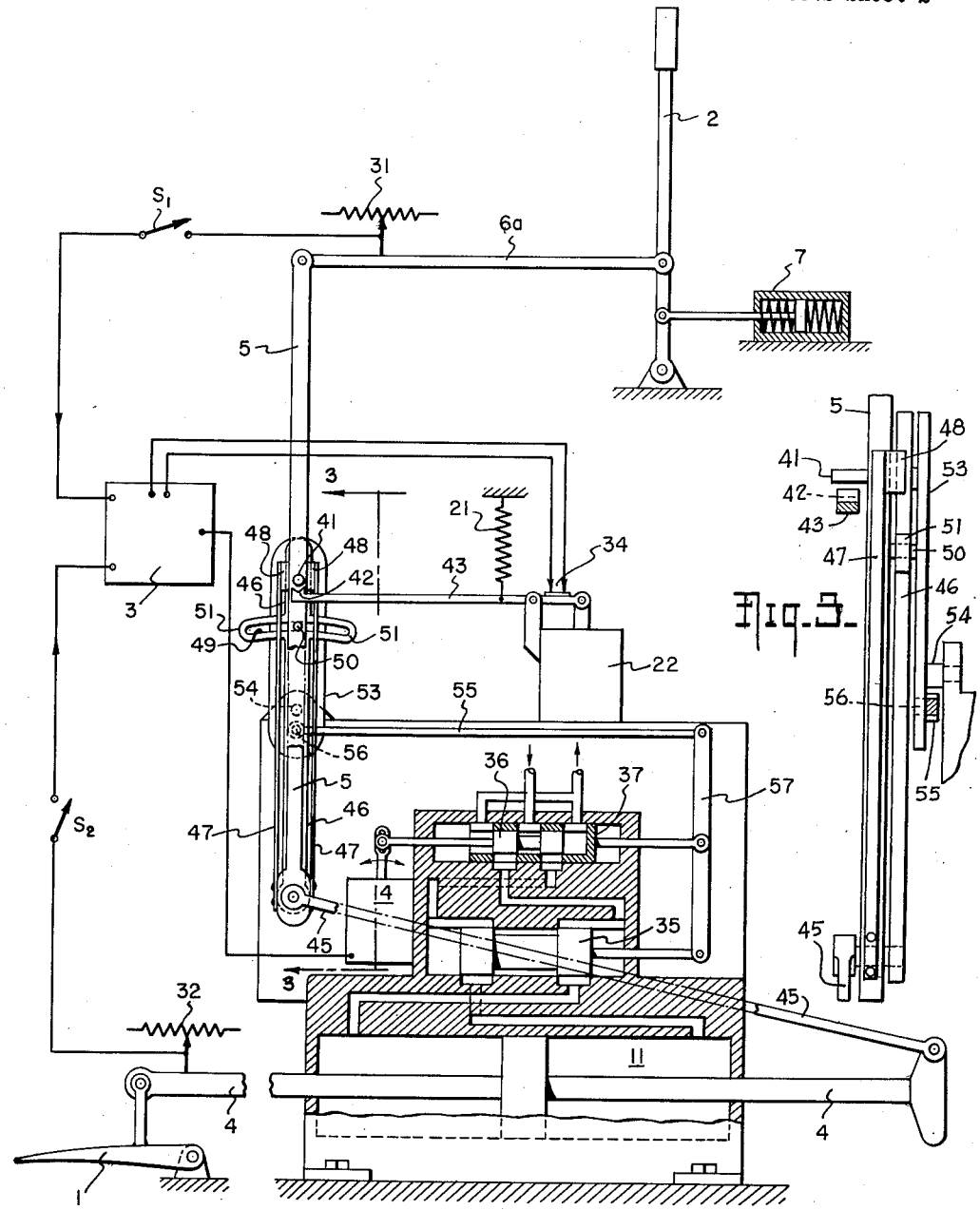

3,020,889
AIRCRAFT CONTROL APPARATUS
Frederick Arthur Summerlin, Isleworth, and Ruben Hadekel, London, England, assignors to The Sperry Gyroscope Company Limited, Brentford, England, a British company
Filed Aug. 6, 1958, Ser. No. 753,440
Claims priority, application Great Britain Aug. 7, 1957
9 Claims. (Cl. 121—41)

This invention relates to aircraft control apparatus including apparatus including a servo actuator coupled to a control rod for deflecting a control surface of the aircraft and one object is to provide an improved means for enabling the control surface to be deflected in response to movement of a manual controller with power assistance from the servo actuator or either directly without assistance, or in response to the output of an automatic pilot.

According to one aspect of the present invention aircraft control apparatus of the kind specified includes a differential link coupled to the control rod and to a manual controller and also to a means for operating the servo actuator so that the actuator operates in accordance with the difference between the movements of the control rod and the manual controller, and a lock or other conditioning means that connects the differential link where it is coupled to the actuator operating means so that it pivots about a fixed axis in relation to the craft without moving the actuator operating means.

When the differential link is locked to pivot about the axis, it acts as a simple lever in a direct mechanical linkage between the manual controller and the control surface.

The apparatus may include an automatic pilot means arranged when the conditioning means fixes the pivot axis of the differential link to operate the actuator operating means, and in a preferred form of the invention the conditioning means includes a coupling that is released if the force tending to move the pivot axis of the differential link exceeds a predetermined limit.

Thus if the automatic pilot requires control which is too harsh, for example requires a control surface deflection which causes a resilient restraint of an automatic feel device on the manual controller in excess of a selected limiting restraint, the pivot axis can be released so that the pivoted link becomes a differential link again and the system reverts to powered manual control. The automatic pilot may be switched out when this occurs. In the same way the pilot can over-ride the automatic pilot by applying an appropriate force to the manual controller.

Another object of the invention is to provide an improved means for disabling the automatic pilot means of the apparatus responsive to the influence of the releasable coupling of the axis conditioning or locking means to cause the apparatus to revert to manual or powered manual operation.

When the conditioning means is ineffective the link coupling the manual controller and surface is a simple differential link which is capable of operating the actuator operating means depending on the difference between the angular positions of the manual controller and the surface from a null condition.

The operating means of the servo actuator may also be controlled in accordance with the difference between an input from differential link and the output of the automatic pilot means. This allows auto-stabilisation to be provided by the apparatus when under manual control.

In order to enable powered manual, or automatic pilot control to be easily resumed after a period of direct manual control, the servo actuator is coupled to the control surface by a differential link that is normally conditioned to function as a lever pivoting about an axis in fixed relation to the aircraft. In direct manual control, the link functioning as a differential permits the surface to deflect independently of the servo actuator under the influence of the manual controller.

The feedback provided for the differential link coupling the servo actuator and control surface of the improved apparatus is a nulling input that is fed to the actuator operating means.

It will be appreciated that aircraft control apparatus according to the first aspect of the invention may also accord with the second aspect of the invention, and that the servo actuators, the connecting elements, the control surfaces and the manual controllers may be identical.

The invention may be carried into practice in various ways and one embodiment will be described by way of example with reference to the accompanying drawings of which:

FIGURE 1 is a schematic diagram showing an apparatus in which an aircraft control surface 1 can be deflected in response to movement of a control column or manual controller 2 either through a servo actuator or manually, or can be deflected in accordance with the output of an automatic pilot 3, FIGURE 2 shows a practical arrangement of a servo actuator and the mechanism for operating it; and FIG. 3 is an enlarged side elevation view of the assembly of levers 5, 46 and 53 from the direction indicated by the section line 3—3 in FIG. 2.

GENERAL DESCRIPTION

The control surface 1 in FIGURE 1 is arranged to be deflected by a control rod 4 which is pivoted at one end to one end of a differential input link 5, and at an intermediate point to one end of an output link 6. The other end of the input link 5 is pivoted to a rod 6ª which has one end pivotally connected to the manual controller or stick 2, which is coupled to a conventional artificial feel device 7.

An intermediate point on the differential link 5 is coupled through a further differential link 8 with the actuator operating means or control valve 9 of a servo actuator 11 whose piston connects with a pivoted extension 12 connected to the frame of the craft. A rod 13 fixed to the casing of the actuator 11 at one end is pivotally connected at its other end to the output link 6.

The other input to the second differential link 8 is coupled to the output of the automatic pilot 3 through a torquing means 14 so that the net movement of the control valve 9 is dependent on the difference between the movements imparted by the differential link 5 and the means 14.

Means are provided for conditioning the input and output links 5 and 6 so that the same functions as levers that pivot about an axis in fixed relation to the aircraft. The intermediate point on the differential input link 5, which is coupled to the actuator operating means 9 of the servo actuator 11, is pivotally mounted on a slide 15 having a pair of notches 16 and 17 which can be engaged with respective latches 18 and 19 to prevent sliding of the slide 15 and thus to fix the intermediate point of the differential link 5 to pivot about a fixed axis. The latch 18 is biased toward its notch 16 by a spring 21, but can be moved out of engagement with its notch by operation of actuator 22. The latch 19 may be held in engagement with its notch 17 by a spring 23 and can be moved out of engagement with the latch by operation of an actuator 24. The slide 15 and latching means provided for the link 5 constitutes a means for conditioning the pivotal connection between the link 5 and a link 8a of a mechanism or means including link 8 providing an input to the actuator operating means in fixed relation to the aircraft. In this condition, the link 5 pivots about a fixed axis as a lever that provides a null input to the link 8 from either the surface 1 or the controller 2.

The output link 6 also has an intermediate point pivotally connected to a slide 25 having a notch 26 which can be engaged by a latch 27 which is normally held out of engagement with the notch by a spring 28 but can be moved into engagement with it by an actuator 29. The slide 25 and associated latching means constitutes a conditioning means for the differential link 6 whereby the same normally functions as a lever pivoting about an axis in fixed relation to the craft.

The rods 6a and 13 from the manual controller 2 and the casing of the servo actuator respectively carry wiper arms to potentiometers 31 and 32 so that feed-back signals proportional to the displacement of these rods from zero positions can be fed to the automatic pilot 3. In a modification the potentiometer 31' has its wiper driven by the slide 25 coupled to the output link 6.

OPERATION

*Powered control*

For controlling the control surface 1 from the manual controller 2 using the power of the servo actuator 11, the latches 18 and 19 are disengaged so that the slide 15 is free to move, and the link 5 acts as a differential link. The latch 27 is engaged to fix the slide 25, and the pivot axis of the output link 6. Switches in the connections from the wipers of the potentiometers 31 and 32 to the automatic pilot are open so that no electrical feed-back occurs in this mode of operation. Deflection of the manual controller 2 causes movement of the actuator operating means 9 through the differential link 5, and the servo actuator 11 moves to deflect the control surface 1 through the output link 6, the control rod 4, and the movement of the control rod 4 providing mechanical feedback to the differential input link 5, which balances the movement fed in from the manual controller 2.

Auto stabilization, that is to say, compensation for extraneous movement of the aircraft in relation to the attitude corresponding to the deflection of the stick 2 is provided by rate gyroscopes in the automatic pilot 3, through the torquing means 14, which is differentially coupled to the control valve or operating means 9 through the differential link 8. In this way control surface movements proportion to the displacement from null of the torquing means of the automatic pilot are superimposed on the human pilot's normal control movements without producing corresponding movement at the stick 2. The rate gyroscopes are only capable of producing limited auto stabilisation control movements.

*Automatic pilot*

For operation under control of the automatic pilot 3 the latch 18 is engaged to fix the slide 15 and allow the link 5 to pivot about the intermediate point. The latch 27 is also engaged so that the output link 6 operates in the same way as for power control. The stick 2 is now directly connected through rod 6a, link 5 functioning as a lever and rod 4 with the control surface 1, and as long as the latch 18 is engaged cannot cause movement of the actuator operating means 9, which is moved in response to the output of the automatic pilot 3 and torque means 14 to cause deflection of the control surface 1. Electrical feed-back is obtained from the potentiometer 32 to the automatic pilot 3, but no mechanical feed-back is obtained as the intermediate point on the link 5 is fixed in position.

The notch 16 and the latch 18 are, however, arranged with inclined sides to include a releasable coupling in the conditioning means so that if the force tending to move the slide 15 is great enough, the latch 18 can be pushed out of notch 16 to release the pivot and restore the differential link 5 to its original condition as for powered control. A switch 34 is arranged to be closed when this occurs to disable the automatic pilot and restore the system to the power control condition as described above. The apparatus accordingly includes normally ineffective means for disabling the automatic pilot. The switch 34 constitutes a means responsive to the release of the coupling for rendering the disabling means effective.

This disengagement of the automatic pilot control can be effected if there is a fast run-away due to a fault in the automatic pilot since the artificial feel device 7 will resist the sudden tendency of the manual controller 2 to move, sufficiently to allow the latch 18 to be forced out of its notch. Disengagement of the automatic pilot can also be effected by the human pilot by applying a moderate force on the stick 2 to over-ride the automatic pilot.

In other words, the maximum control movement in the automatic pilot mode of operation is limited by the reaction from the artificial feel device, and this feature is an improvement over the known feature of limiting the maximum torque that can be applied during the automatic pilot operation, in which the control moves rapidly to maximum deflection and stays there until the human pilot takes some action, and in consequence less load on the controls and less change of attitude will be experienced.

*Manual control*

In the event of hydraulic failure or otherwise, the control surface 1 can be controlled manually from the stick 2 without using the servo actuator 11, and in this mode of operation the latch 19 is engaged in its notch 17 but the latches 18 and 27 are disengaged. The differential link 5 now functions as a lever and no means are provided for allowing the latch to slip, but since the pivot axis on the output link 6 can move with the slide 25, the servo actuator 11 is unable to deflect the control surface 1.

However, it is important to ensure that if the power control is required to be re-engaged, the servo actuator 11 shall be in the correct position in relation to the instantaneous position of the stick 2, and accordingly means are provided for feeding back an input to the actuator operating means 9 to control the differential link 6. As shown, feed-back to the automatic pilot 3 is provided from both potentiometers 31 and 32 in accordance with the difference between the movements of the rods 6a and 13 to operate the actuator operating means 9 to put it in a position corresponding to the position of the stick 2. This means that the notch 26 always remains under the latch 27.

In the modification feedback is only required from the potentiometer 31', and this operates the servo actuator 11 to maintain the slide 25 in the zero position, and in this case the feedback from the potentiometer 32 on the rod 13 is disconnected.

A practical arrangement of the servo actuator 11 and the mechanism for controlling it is sketched in FIGURE 2; components which correspond with components in FIGURE 1 have been given the same reference numerals.

The servo actuator 11 is used to deflect the control surface 1 through the control rod 4 in response to movement of the spool 35 of its main control valve, which spool 35 is itself controlled in accordance with the position of the spool 36 of an auxiliary control valve in relation to a sleeve 37 in which the spool 36 can slide.

This auxiliary control valve is the equivalent of the differential link 8 in FIGURE 1, for the spool 36 is driven by the torquing means 14 of the automatic pilot 3, while the sleeve 37 is driven from the differential link 5. Thus, movement of the spool 36 to the right in FIGURE 2 produces the same effect as movement of the sleeve 37 to the left and the auxiliary control valve can be closed again after such movement of either of the elements by a follow-up movement of the other, which may be caused by the consequential movement of the main spool 35.

Movement of the spool 36 to the left, or of the sleeve 37 to the right, produces movement of the spool 35 of the main control valve to the left and this in turn causes movement of the piston of the servo actuator 11 and of the control rod 4 to which it is fixed, to the right.

The equivalent of the latching mechanism 15, 16, 18, 21 and 22 in FIGURE 1 is provided by following mechanism on the differential link 5. At its mid-point the differential link 5 carries a boss 41 which can co-operate with a V-shaped notch 42 formed at the end of an arm 43 operated by the actuator 22. The notch 42 is normally urged by a spring 21 (shown diagrammatically), into engagement with the boss 41, so as to lock this point on the differential link 5 and make a fulcrum about which the link can turn. The lock can be released by operation of the actuator 22 against the spring 21 to allow the link 5 to operate as a differential link, in the manner described with reference to FIGURE 1 for powered manual operation.

At its lower end the differential link 5 is pivotally connected to a feed-back rod 45, the other end of which is pivotally connected to the rear end of the control rod 4 which projects beyond the back of the servo actuator 11. This connection is the equivalent of the part of the rod 4 in FIGURE 1 which is connected to the link 5 and ensures that movement of the output of the differential link 5 depends upon the difference between movements of the control column 2 and the control surface 1 during powered manual control.

Immediately below, and in a parallel plane with, the lower half of the differential link 5, as shown in FIGS. 2 and 3, is an intermediate link 46 which is pivotally mounted at its lower end to the link 5 and the feed-back rod 45, and is normally held at its upper end in alignment with the link 5 at the boss 41 by means of a pair of cantilever springs 47 fixed to the lower end of the link 5, and having pads 48 at their upper ends which bear on both the links 5 and 46.

If the control valve of the actuator 11 were locked, the stick 2 could still be moved, for example, to operate the control valve of a duplicate actuator by forcing the cantilever springs 47 to give to allow the link 5 to move in relation to the link 46, which was held inoperable by the control valve which had stuck.

The cantilever springs 47 are arranged to give under a load of about 5 lbs. after which they would allow the link 5 to move in relation to the intermediate link 46 without much additional force, to the extent of its travel, as determined by contact of a boss 50 on the link 5 with the ends of an arcuate slot 49 formed in a pair of ears 51 on either side of the intermediate link 46.

The output from the differential link 5 is taken from an output link 53 which is pivotally connected to the upper end of the intermediate link 46 at its upper end and to a pivot 54 on the casing of the control valve at its lower end. An operating rod 55 runs from a pivot 56 just on the other side of the pivot 54 from the central pivot of the differential link 5 to the upper end of an auxiliary differential link 57 whose central pivot is connected to the sleeve 37 of the auxiliary control valve and whose lower pivot is connected to the spool 35 of the main control valve for the actuator 11.

OPERATION

Powered manual control

When the control surface 1 is to be deflected by movement of the control column 2 through the medium of the servo actuator 11, the operation is generally as described with reference to FIGURE 1, but the following points should be noted.

The notch 42 is free from the boss 41, the switches $S_1$ and $S_2$ are open, and there is no output from the automatic pilot 3.

As the differential link 5 pivots about its lower end, say anti-clockwise in FIGURE 2, the intermediate link 46 pivots with it (this is in normal operation when the cantilever springs 47 have not given) and the output link 53 moves about the pivot 54, so that the point 56 moves to the right although the movement is much smaller than the initial movement of the upper end of the differential link 5 because of the short lever arm between the pivots 54 and 56. The upper end of the auxiliary differential link 57 also moves to the right, pivoting about its lower end, and pulls the sleeve 37 of the auxiliary control valve to the right. In consequence, the main spool 35 moves to the left, restoring the sleeve 37 to its original position as it does so, and the control rod 4 moves to the right.

The movement of the control surface 1 is fed back through the feed-back rod 45 to the lower end of the differential link 5 until the pivot point 56 is returned to its original position when the auxiliary control valve goes through the reverse operation and closes the main control valve.

Automatic control

When the aircraft is controlled by the output of the automatic pilot 3, the notch 42 engages the boss 41 to fix the central point of the differential link 5 and the switch $S_2$ is closed to provide feed-back to the automatic pilot from the rod 4 of the servo actuator 11.

When the auto-pilot 3 generates a signal requiring a control surface movement, the torquing means 14 moves the auxiliary spool 36, say to the left, which causes the main spool 35 also to move to the left and as it does so the auxiliary differential link 57 pivots in a clockwise direction about its upper end to move the sleeve 37 and close the auxiliary valve with the spool 35 in an open position. The control rod 4 moves to the right, and feed-back from the potentiometer 32 is fed to the auto-pilot 3 to oppose the signal which initiated the movement.

At the same time, the feed-back rod 45 causes the differential link 5 to pivot about the locked boss 41 in an anti-clockwise direction so that the stick 2 also moves anti-clockwise against the artificial feel device 7 and thus takes up a position corresponding to the deflection imparted to the control surface 1.

When the auto-pilot output returns to null, the auxiliary spool 36 is also moved back to stop the movement of the servo actuator 11.

Safety measure: Reversion to powered manual control

A feature of the invention is the manner in which, if the automatic pilot requires too great a deflection of the control surface 1, the system reverts to powered manual control from the control column 2.

The movement described above of the control surface in response to a signal from the automatic pilot 3 effected corresponding movement of the manual controller 2 and this was opposed by the force of the springs in the artificial feel device 7. If the deflection of the control surface is great enough, the springs in the feel device 7 will be deflected enough to produce a force which will cause the boss 41 to be forced out of the notch 42, so that the central point of the differential link 5 is free, as in powered manual control. The actual force required to release the notch 42 depends upon the relationship between the stiffness of the springs in the feel device 7 and that of the spring 21 and also the lengths of the various lever arms in the linkage and it can be arranged to be released at say a 40 lbs. load laterally on the boss 41.

For a movement of the control rod 4 to the right, the rod 6a will tend to move to the left and this will be opposed by the springs in the feel device, so that if the boss 41 is forced out of the notch 42, it will move to the right. This movement will cause the operating rod 55 to move to the left so that the auxiliary differential link 57 will pivot in an anti-clockwise direction about its lower end and move the sleeve 37 to the left to cause the main spool 35 to close and remove the control.

When the arm 43 is forced clear of the boss 41, it is arranged to close contacts 34 as described with reference to FIGURE 1 to trip or disable the auto-pilot 3 so that the system is once more in the condition for powered manual control.

It will be seen that the release of the lock on differential link 5 is effected mechanically by the force of the springs in the artificial feel device 7 and that this same force is used to close the valve of the servo actuator 11. The springs of the artificial feel device 7 will then tend to return the control surface 1 and stick 2 to positions corresponding to the setting of the artificial feel device through the servo actuator 11 in the manner already described for powered manual operation.

The arrangement shown in FIGURE 2 has the other advantages described with reference to the arrangement shown in FIGURE 1 except that no provision for direct manual control is shown. This could be provided, if desired, by means of a non-releasable lock on the central point of the differential link 5, and by releasing the piston of the servo actuator 11.

What is claimed is:
1. Apparatus for controlling the deflective surface of an aircraft including a servo actuator operatively connected to the surface, a manual controller, means for coupling the surface and manual controller including a first differential link operatively connected to the surface and controller having an output link pivotally connected thereto, automatic pilot means having an output, means for operating said servo actuator including a second differential link responsive to the outputs of said automatic pilot means and said output link, and means for conditioning said output link to fix its pivot axis on the first differential link in relation to the aircraft and thereby null the input to said second differential link from said first differential link.

2. Apparatus as claimed in claim 1, in which said conditioning means includes a coupling between the pivotal connection of the output link on the first differential link and the aircraft that releases the output link from its fixed relation to the aircraft when the force exerted thereon exceeds a predetermined limit.

3. Apparatus as claimed in claim 2, including normally ineffective means for disabling said automatic pilot means, and means responsive to said coupling when the output link is released by said conditioning means operable to render said disabling means effective.

4. Apparatus for controlling the deflective surface of an aircraft including a manual controller, a servo actuator, a first differential link connecting said actuator and surface, first means for conditioning said first differential link to pivot about a fixed axis in relation to the aircraft, means for coupling the surface and manual controller including a second differential link operatively connected to the surface and controller having an output link pivotally connected thereto, automatic pilot means having an output, means for operating said servo actuator including a third differential link responsive to the outputs of said automatic pilot means and said output link, and second means for conditioning said output link to fix its pivot axis on the second differential link in relation to the aircraft and thereby null the input to said third differential link from said second differential link.

5. Apparatus as claimed in claim 4, in which said second conditioning means includes a coupling between the pivotal connection of the output link on the second differential link and the aircraft that releases the output link from its fixed relation to the aircraft when the force exerted thereon exceeds a predetermined limit.

6. Apparatus as claimed in claim 5, including normally ineffective means for disabling said automatic pilot means, and means responsive to said coupling when the output link is released by said second conditioning means operable to render said disabling means effective.

7. Apparatus as claimed in claim 5, including means for rendering the conditioning means for said first differential link ineffective.

8. In apparatus for controlling the deflective surface of an aircraft, a manual controller, a servo actuator operatively connected to the surface, means for coupling the surface and manual controller including a differential link operatively connected to the surface and the controller, means for operating said servo actuator, differential means with an output operatively connected to said actuator operating means including an input link with a pivotal connection to said differential link, normally ineffective means for conditioning said differential link to fix the pivotal connection between it and the input link in relation to the aircraft and thereby null the input to the differential means from the differential link, and means for rendering said conditioning means effective.

9. In apparatus for controlling the deflective surface of an aircraft, a manual controller, a servo actuator, a first differential link connecting said actuator and surface, means for conditioning said first differential link to pivot about a fixed axis in relation to the aircraft, means for coupling the surface and manual controller including a second differential link operatively connected to the surface and the controller having an output link pivotally connected thereto, means for operating said servo actuator including differential means responsive to the output of said output link, and means for disabling said conditioning means.

References Cited in the file of this patent
UNITED STATES PATENTS

| | | |
|---|---|---|
| 2,678,177 | Chenery | May 11, 1954 |
| 2,755,870 | Gerstenberger | July 24, 1956 |
| 2,846,982 | Huppert | Aug. 12, 1958 |
| 2,859,926 | Westbury | Nov. 11, 1958 |
| 2,877,742 | Richolt | Mar. 17, 1959 |